United States Patent
Felder

(10) Patent No.: US 7,580,671 B2
(45) Date of Patent: Aug. 25, 2009

(54) AUDIO SYSTEM, RADIO RECORD MODULE AND METHODS FOR USE THEREWITH

(75) Inventor: Matthew D. Felder, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 590 days.

(21) Appl. No.: 11/415,826

(22) Filed: May 2, 2006

(65) Prior Publication Data

US 2007/0259650 A1    Nov. 8, 2007

(51) Int. Cl.
*H04H 60/09* (2008.01)
*H04B 1/18* (2006.01)

(52) U.S. Cl. .................. 455/3.04; 455/3.01; 455/186.1

(58) Field of Classification Search .............. 455/186.1, 455/161.2, 166.2, 184.1, 3.01, 3.04, 345
See application file for complete search history.

(56) References Cited

U.S. PATENT DOCUMENTS

| | | | | |
|---|---|---|---|---|
| 5,719,943 A * | 2/1998 | Amada et al. | ................ | 380/202 |
| 5,790,958 A * | 8/1998 | McCoy et al. | ................ | 455/557 |
| 6,088,455 A * | 7/2000 | Logan et al. | ................. | 380/200 |
| 6,112,064 A * | 8/2000 | Arrowsmith et al. | ..... | 455/186.1 |
| 6,766,523 B2 * | 7/2004 | Herley | ........................... | 725/19 |
| 2005/0044561 A1 * | 2/2005 | McDonald | .................... | 725/18 |

* cited by examiner

*Primary Examiner*—Sonny Trinh
(74) *Attorney, Agent, or Firm*—Meschkow & Gresham PLC

(57) ABSTRACT

A radio record module includes a radio data system (RDS) decoder module that decodes a received RDS signal, that has an associated audio signal, into received RDS data. A memory module stores a record request, the record request having an RDS parameter. A comparison module compares the received RDS data to the RDS parameter of the record request and asserts a record signal when the received RDS data compares favorably to the RDS parameter. A recording module records the associated audio signal in response to the record signal being asserted.

45 Claims, 16 Drawing Sheets

US 7,580,671 B2

AUDIO SYSTEM, RADIO RECORD MODULE AND METHODS FOR USE THEREWITH

TECHNICAL FIELD OF THE INVENTION

The present invention relates to audio systems, radio receivers that receive Radio Data System data and related methods.

DESCRIPTION OF RELATED ART

As is known, data can be sent over broadcast frequency modulation (FM) radio broadcasts using the Radio Data System (RDS) and/or Radio Broadcast Data System (RBDS) standards. A third harmonic of the 19 kHz FM stereo pilot tone is used to generate a 57 kHz subcarrier that is modulated by a 1.1875 kbits/sec data signal. In this fashion, data such as station call letters and programming information, can be transmitted, along with the associated audio content, to a radio receiver for display to the user. In addition, data can be transmitted that allows a radio receiver to retune to broadcast stations transmitting on different frequencies if the original station signal drops out. Further data relating to frequencies to tune to special traffic bulletins and other travel information can likewise be broadcast.

Current radio receivers make limited use of the RDS data that is transmitted. Further limitations and disadvantages of conventional and traditional approaches will become apparent to one of ordinary skill in the art through comparison to systems with the present invention as disclosed herein.

DETAILED DESCRIPTION OF THE INVENTION INCLUDING THE PRESENTLY PREFERRED EMBODIMENTS

Figure 1:
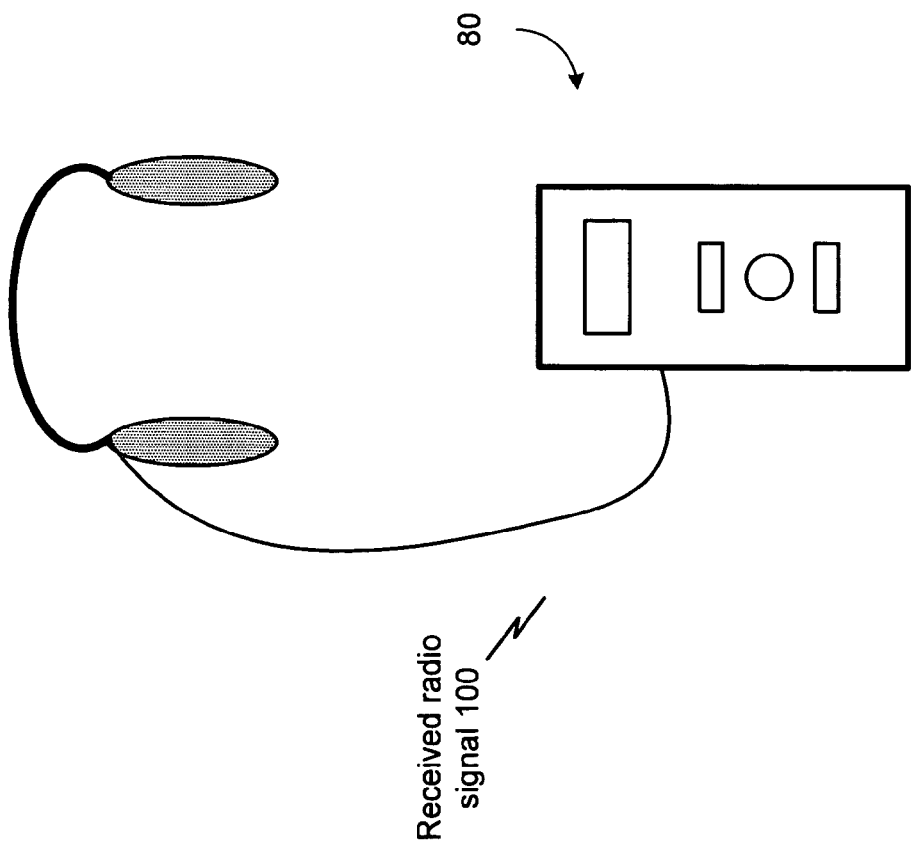
FIG. 1 presents a pictorial diagram of a handheld audio system in accordance with an embodiment of the present invention.

FIG. 1 presents a pictorial diagram of a handheld audio system in accordance with an embodiment of the present invention. In particular, a handheld audio system 80 is shown that receives a received radio signal 100 that carries RDS data and an associated audio signal over one or more channels having corresponding carrier frequencies. The received radio signal 100 can be an AM radio signal, FM radio signal, satellite radio signal, cable radio signal, or other radio signal that can carry RDS data and an associated audio signal. As used herein RDS data shall mean data that is transmitted in accordance with the RDS standard, the RBDS standard or any similar data transmission system. In operation, the handheld audio system 80 produces an audio output from the received radio signal or from stored MP3 files, stored WMA files, and/or other stored digital audio files. Handheld audio system 80 includes an audio system and/or radio record module that implements one or more of the features and functions in accordance with an embodiment of the present invention as set forth further in conjunction with the remaining figures and the appended claims.

Figure 2:
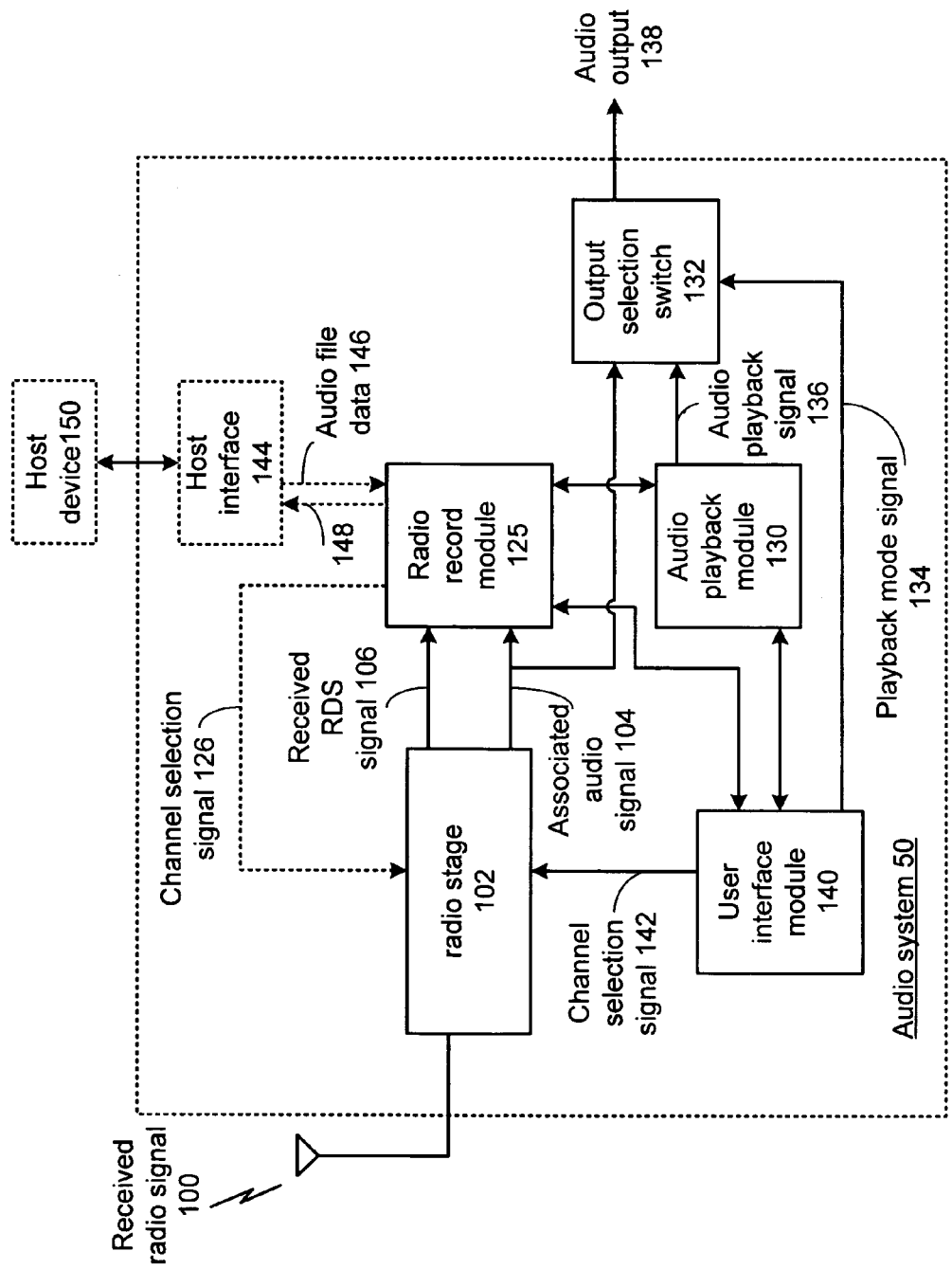
FIG. 2 presents a block diagram of an audio system in accordance with an embodiment of the present invention.

FIG. 2 presents a block diagram of an audio system in accordance with an embodiment of the present invention. In particular, audio system 50 includes a radio stage 102 that demodulates a selected channel of a received radio signal 100 into a received radio data system (RDS) signal 106 and an associated audio signal 104. In an embodiment of the present invention, audio system 50 can be used in handheld audio system 80. However, in alternative embodiments, audio system 50 can be implemented in a host of other electronic devices, radio receivers, automotive audio systems, stereo systems and the like.

In an embodiment of the present invention, radio stage 102 includes a radio receiver, such as a low intermediate frequency (IF) receiver, superheterodyne receiver, or other receiver that demodulates and down converts a channel of received radio signal 100, based on either channel selection signal 142 from user interface module 140 or from optional channel selection signal 126, to a baseband signal, near baseband signal, or low intermediate frequency (IF) signal. The associated audio channel signal 104 is generated by decoding stereo sum and difference signals into right and left channel audio signals from the audio content of the selected channel. Received RDS signal 106 is formed by extracting the 19 kHz pilot tone from the demodulated signal, forming a 57 kHz subcarrier signal by clipping the 19 kHz pilot tone and extracting the third harmonic, and down converting modulated RDS signal using the 57 kHz subcarrier. However, other methods and structure can likewise be utilized to demodulate the radio signal 100 into a received RDS signal 106 and associated audio signal 104 in other embodiments of the present invention.

In an embodiment, radio record module 125 stores a record request 222 that has an RDS parameter. Further, the radio record module 125 is operable to decode the received RDS signal into received RDS data, to compare the received RDS data to the RDS parameter of the record request 222 and to assert a record signal 128 when the received RDS data compares favorably to the RDS parameter. In addition, radio record module 125 records the associated audio signal 104 in response to the record signal 128 being asserted.

In an embodiment of the present invention, the received RDS data includes a plurality of information fields such as: alternative frequencies, clock time, enhanced other networks, program information, program service, program type, regional links, radio text, travel announcements, traffic program, traffic message channel, and other information fields that can be broadcast over received radio signal 100. The record request 222 includes one or more RDS parameters that are meant to match data that could be contained in one or more of the information fields of the received RDS data.

For example, the record request 222 can include an RDS parameter such as the radio program title of a radio text information field. In this fashion, a record request 222 can be set to record a particular radio program such as, "Car Talk". In operation, radio record module 125 decodes received RDS signal 106 into received RDS data, extracts program title data from the radio text information field and compares this extracted data to the RDS parameter of the record request 222—in this case "Car Talk". When the Car Talk program begins, the received RDS data matches the RDS parameter of the record request 222 and the radio record module 125 asserts the record signal 128 and begins recording the associated audio signal 104, in this case, the Car Talk show. In an embodiment, the record request 222 can include the duration to be recorded, such as 30 minutes, one hour, etc. and the recording continues for this length of time. However, other methods for choosing the record duration can be used including, stopping the recording if the program title field indicates a different program has begun, if the channel is changed by the user, if a stop time is reached (such as 1:00 pm), etc.

In an alternate embodiment the radio program recording can begin before the RDS matching occurs (buffering the data) and only storing the recorded file when a match is made. In this fashion, the beginning of a program can still be recorded, even if an RDS match is detected after a program has started. Further details regarding the implementation of this embodiment will be discussed in conjunction with FIG. 8.

In another example, the record request 222 can include an RDS parameter such as a song title of a radio text information field. In this fashion, a record request 222 can be set to record a particular song such as, "Great Balls of Fire". In operation, radio record module 125 decodes received RDS signal 106 into received RDS data, extracts song title data from the radio text information field and compares this extracted data to the RDS parameter of the record request 222—in this case "Great Balls of Fire". When the song Great Balls of Fire begins, the received RDS data matches the RDS parameter of the record request 222 and the radio record module 125 asserts the record signal 128 and begins recording the associated audio signal 104, in this case, the song Great Balls of Fire. In an embodiment, the record request 222 can include the duration to be recorded, such as a duration corresponding to the duration of the song and the recording continues for this length of time. However, other methods for choosing the record duration can be used including, stopping the recording if the song title field indicates a different song has begun, if the channel is changed by the user, etc.

In another example, the record request 222 can include an RDS parameter such as an artist name, that includes the name of a radio personality, show host, recording artist, or guest, etc. that is included in a radio text information field. In this fashion, a record request 222 can be set to record songs from a particular recording artist such as, "Bob Marley". In operation, radio record module 125 decodes received RDS signal 106 into received RDS data, artist name data from the radio text information field and compares this extracted data to the RDS parameter of the record request 222—in this case "Bob Marley". When a song by Bob Marley begins, the received RDS data matches the RDS parameter of the record request 222 and the radio record module 125 asserts the record signal 128 and begins recording the associated audio signal 104, in this case, the song by Bob Marley. In an embodiment, the record request 222 can include the duration to be recorded and the recording continues for this length of time. However, other methods for choosing the record duration can be used including, stopping the recording if the program title field indicates a song by different artist, for instance, "Florence Foster Jenkins" has begun, if the channel is changed by the user, silence is detected in either the associated audio signal and the digital audio signal, etc.

In another example, the record request 222 can include an RDS parameter such as a program type of a program type information field. In this fashion, a record request 222 can be set to record programs of a particular program type such as, "news". In operation, radio record module 125 decodes received RDS signal 106 into received RDS data, extracts program type data from the radio text information field and compares this extracted data to the RDS parameter of the record request 222—in this case "news". When a news program begins, the received RDS data matches the RDS parameter of the record request 222 and the radio record module 125 asserts the record signal 128 and begins recording the associated audio signal 104, in this case, the news program. In an embodiment, the record request 222 can include the duration to be recorded and the recording continues for this length of time. However, other methods for choosing the record duration can be used including, stopping the recording if the program title field indicates a different program type, for instance, "Jazz" has begun, if the channel is changed by the user, etc.

While the examples above would include an exact match between the RDS parameters and the record request 222, other search schemes using techniques such as fuzzy logic, wildcard searches, and partial parameters that use search requests such as "Great Ball", "Great Balls Fire" "Balls of Fir**", etc., may also be employed in accordance with the present invention.

In another example, the record request 222 can include an RDS parameter such as a time of a clock time information field. In this fashion, a record request 222 can be set to record from 1:00 pm-2:00 pm, that perhaps corresponds to the time of a favorite show. In operation, radio record module 125 decodes received RDS signal 106 into received RDS data, extracts the time from the clock time information field and compares this extracted data to the RDS parameter of the record request 222—in this case "1:00 pm". When it is 1:00 pm, the received RDS data matches the RDS parameter of the record request 222 and the radio record module 125 asserts the record signal 128 and begins recording the associated audio signal 104, in this case, the favorite show. In an embodiment, the recording ends after the stop time is reached, in this case 2:00 pm.

While the examples above have been described in terms of a single RDS parameter, multiple RDS parameters can be included in a single record request 222. For example, a record request 222 can include a song title and artist name, such as "Great Balls of Fire" and "Jerry Lee Lewis". In an embodiment of the present invention the record request 222 includes a plurality of RDS parameters and the radio record module 125 asserts the record signal 128 when the received RDS data 106 compares favorably to each of the plurality of RDS parameters. In the alternative, radio record module 125 can assert the record signal 128 when the received RDS data 106 compares favorably to one of the plurality of RDS parameters. In an embodiment, the record request 222 can include an "OR mode" indicator or an "AND mode" indicator to determine if all of the RDS parameters must be matched to begin recording or if only one parameters needs to match.

In an embodiment of the present invention, the record request 222 also includes a desired channel, and wherein the radio record module 125 generates optional channel selection signal 126 to tune the radio stage 102 to the selected channel. For instance, a record request 222 can include data that indicates, "record the station KFMA at 89.5 MHz from 1:00 pm-2:00 pm". In addition, the desired channel designation can optionally be used in conjunction with any of the other examples provided above.

Record module records and stores the associated audio signal 106 as a digital audio file in a format such as Windows Media Architecture (WMA), a Motion Picture Expert Group (MPEG) audio format such as MP3, MP4 files, PRO, Ogg Vorbis, Advanced Audio Coding (ACC) or other digital file format. Audio system 125 includes audio playback module 130 that generates an audio playback signal 136 from the digital audio file. Audio system 125 includes an output selection switch 132, that produces an audio output 138 that includes the audio playback signal 136 when a playback mode signal 134 is asserted, and that includes the associated audio signal 104 when the playback mode signal 136 is deasserted. The playback mode signal 136 is generated by user interface module 140 in response to an action of a user. This allows the user to select between the live audio stream of associated audio channel 104 or the playback of a digital audio file, regardless of whether or not an audio program is being recorded.

In an embodiment of the present invention, user interface module 140 further includes a keyboard, pointing device, buttons, touch screen or other input device and a display, sound generator, lights or other output devices that allow the user to interact with the device. The user interface module 140 generates channel selection signal 142 that can (manually) select a particular channel of radio stage 102. The user interface can be coupled to record module 125 to store record request 222 generated by a user, to select digital audio files for playback, to generate record signal 128 to manually command the radio record module 125 to begin recording, to select the playback mode, and to either assert or deassert the playback mode signal 134. In an embodiment of the present invention, the user interface module 140 is further operable to generate a user indication in response to the record signal 128 being asserted. In this fashion, the user has feedback that the recording of associated audio signal 104 has commenced or is in progress, either in response to the user manually selecting the record mode or in response to the record mode being entered by radio record module 125 in response to a record request 222.

Audio system 50 optionally includes host interface 144 that is couplable to a host device 150 and that is operable, when coupled, to receive audio file data 146 from the host device 150 and transmit stored data 148, such as digital audio files created from recorded audio programming, to the host device 150. In this embodiment, audio playback module 130 is further operable to generate the audio playback signal 136 based on the received audio file data 146. In operation, the user can couple the audio system 50 to a host device 150, such as a computer and download and store additional digital audio files for selection by user interface module 140 and playback by audio playback module 130 or to upload recorded programs. Further discussion regarding the operation of optional host interface 144 is presented in association with FIG. 3.

Each of the various modules of audio system 50 can be implemented in hardware, firmware, software or a combination thereof, in accordance with the broad scope of the present invention. In an embodiment of the present invention, one or more functions of radio stage 102, radio record module 125, audio playback module 130, host interface 144, output selection switch 132 and user interface module 140 can be implemented with a processing device that is uses a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in memory. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Figure 3:
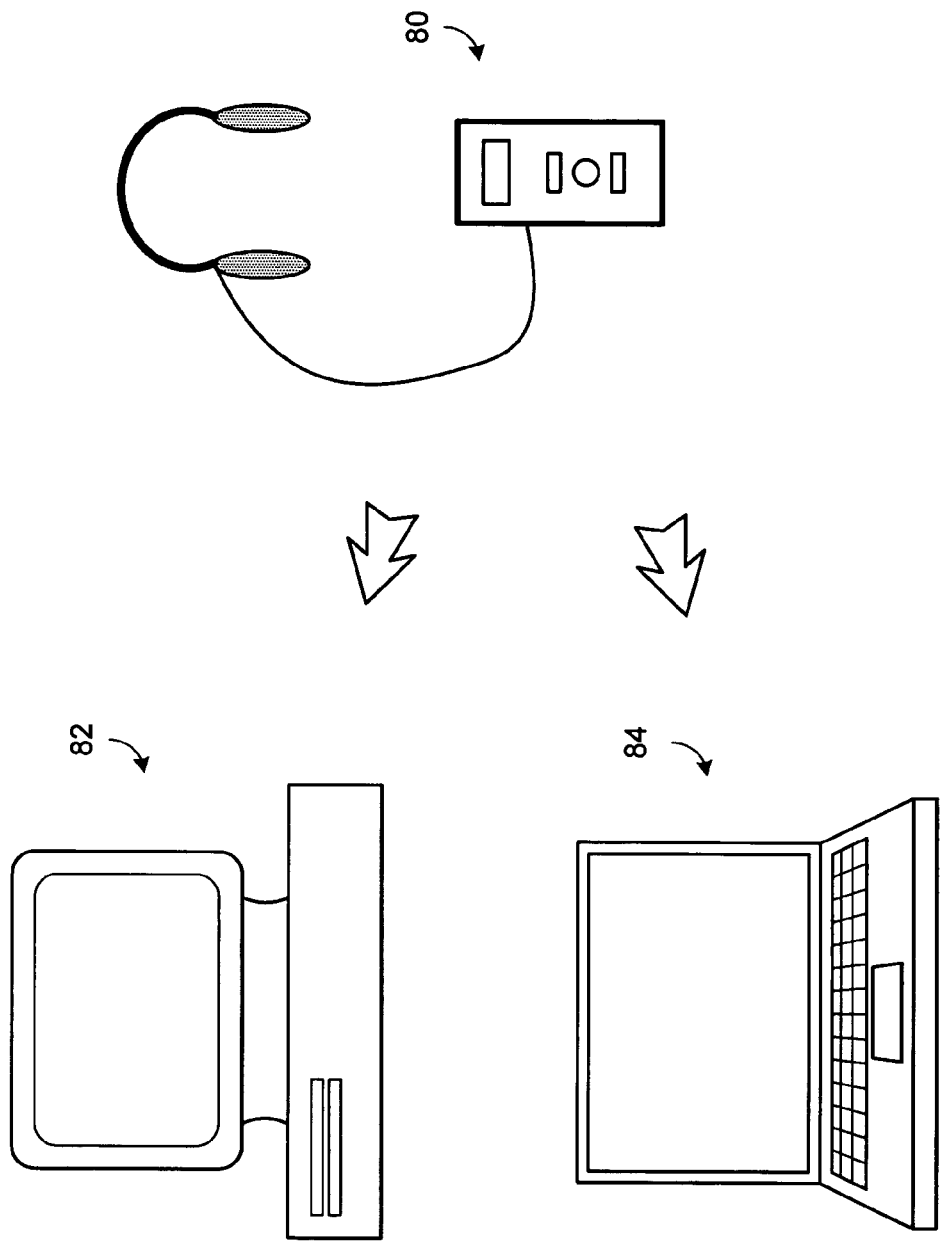
FIG. 3 presents a pictorial diagram of an audio system and host devices that can be coupled thereto in accordance with an embodiment of the present invention.

FIG. 3 presents a pictorial diagram of a handheld audio system and host devices that can be coupled thereto in accordance with an embodiment of the present invention. In particular, handheld audio system 80 includes an audio system such as audio system 50 that includes optional host interface 144. Handheld audio system 80 can be operably coupled to a host device 150 such as computer 82 (that may be a personal computer, workstation, server or access point), laptop computer 84, or any other device that may transceive data with the handheld audio system 80.

With the handheld audio system 80 is coupled to the host device 150, the host interface 144 facilitates the transfer of data between the host device 150 and handheld audio system 80. For example, audio file data 146 received from the host device 150 is first received via the host interface 144 as received data. Depending on the type of coupling between the host device 150 and the handheld audio system 80, the received data will be formatted in a particular manner. For example, if the handheld audio system 80 is coupled to the host device 150 via a universal serial bus (USB) cable, the received data will come from host device 150 in accordance with the format proscribed by the USB specification. The host interface 144 converts the format of the received data (e.g., USB format) into received audio data 146 in a format used by radio record module 125 to store the data by removing overhead data that corresponds to the format of the received data and storing the remaining data as data words. In this mode, the handheld audio system 80 is functioning as extended memory of the host device 150 (e.g., like a thumb drive).

When coupled, the host device 150 can optionally retrieve data from radio record module 125 as if it were part of the memory of host device 150. When requested by host device 150, stored data 148 is provided to the host interface 144, which converts the format of the stored data 146 from the format of the handheld audio system 80 into the format of the coupling between the handheld audio system 80 and the host device 150. The host interface 144 then provides the formatted data to the host device 150 via the coupling.

The coupling between the host device and the handheld audio system 80 may be a wireless connection or a wired connection. For instance, a wireless connection, provided by transceiver module 30 may be in accordance with Bluetooth, IEEE 802.11x, and/or any other wireless LAN (local area network) protocol, IrDA, etc. The wired connection may be in accordance with one or more Ethernet protocols, Firewire, USB, etc. Depending on the particular type of connection, the host interface 144 includes a corresponding encoder and decoder. For example, when the handheld audio system 80 is coupled to the host device via a USB cable, the host interface 144 includes a USB encoder and a USB decoder.

In an embodiment of the present invention, when the handheld audio system 80 is coupled to the host device 150 via a wired connection or direct coupling, the host device 150 may power the handheld audio system 80 such that the battery is unused and/or may further recharge a battery of handheld audio system 80.

Figure 4:
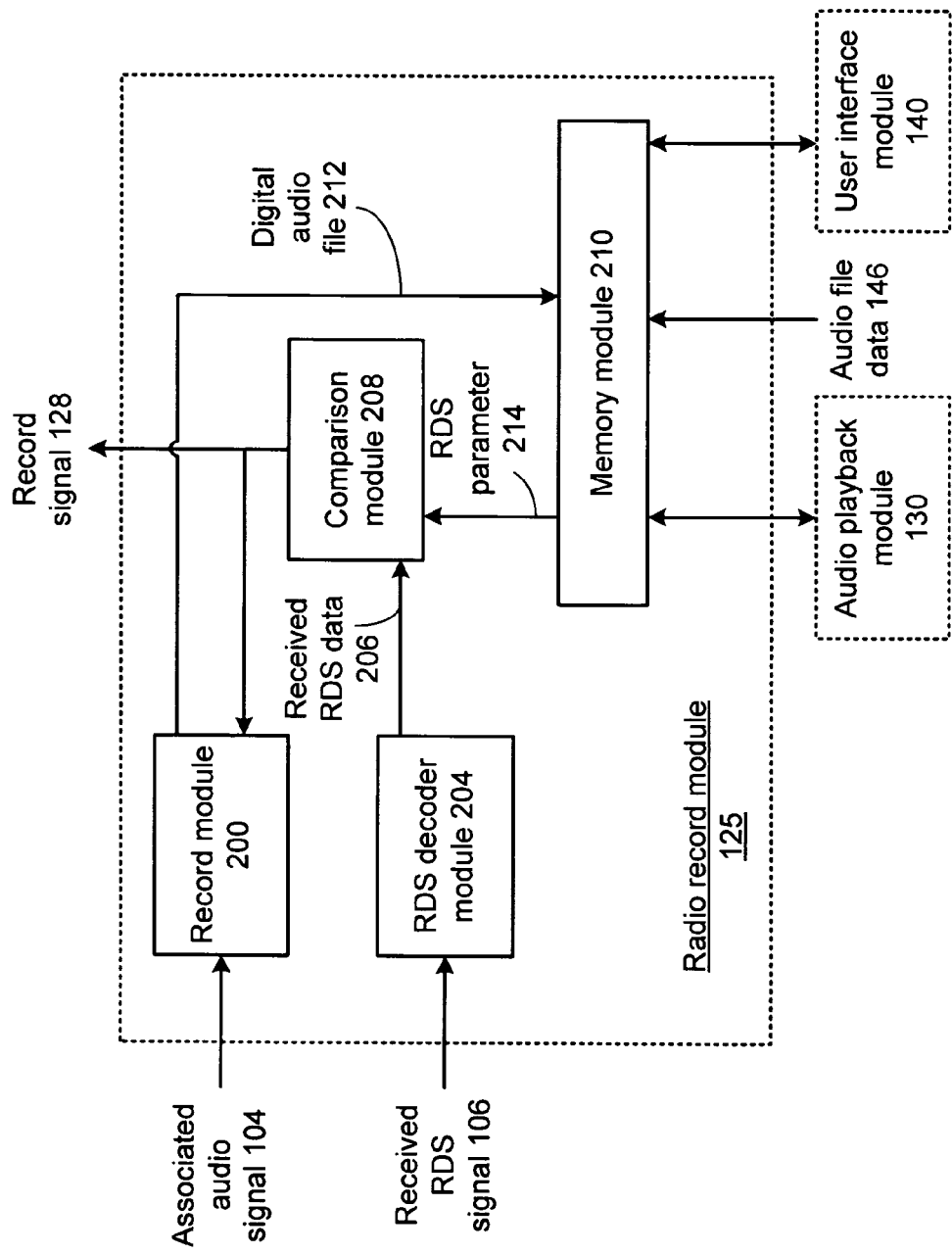
FIG. 4 presents a block diagram of a radio record module in accordance with an embodiment of the present invention.

FIG. 4 presents a block diagram of a radio record module in accordance with an embodiment of the present invention. In particular, radio record module 125 includes a radio data system (RDS) decoder module 204, that decodes a received RDS signal 106, that has an associated audio signal 104, into received RDS data 206. In particular, RDS decoder module 204 includes an analog to digital converter (ADC) that samples the received RDS signal 106 into a digital signal, decodes and extracts the received RDS data 206 from the various RDS information fields.

In an alternative embodiment of the present invention, radio stage 102 includes an analog to digital converter (ADC) and a digital section for performing one or more steps in the demodulation of received radio signal 100. In this embodiment, associated audio signal 104 and/or received RDS signal 106 can be digital signals and, in particular, the ADC of RDS decoder module 204 can be omitted.

Memory module 210 stores a record request 222. Comparison module 208 compares the received RDS data 206 to one or more RDS parameters 214 of the record request 222 and asserts record signal 128 when the received RDS data 206 compares favorably to the RDS parameter 214. Recording module 200 records the associated audio signal 104 in response to the record signal 128 being asserted and creates a digital audio file 212 that is stored in memory module 210.

In an embodiment of the present invention, the memory module 210 stores a plurality of record requests 222 and the comparison module 208 is operable to compare the received RDS data 206 to the RDS parameter 214 of a plurality of the record requests, and to assert the record signal if any of the record requests are satisfied.

Figure 5:
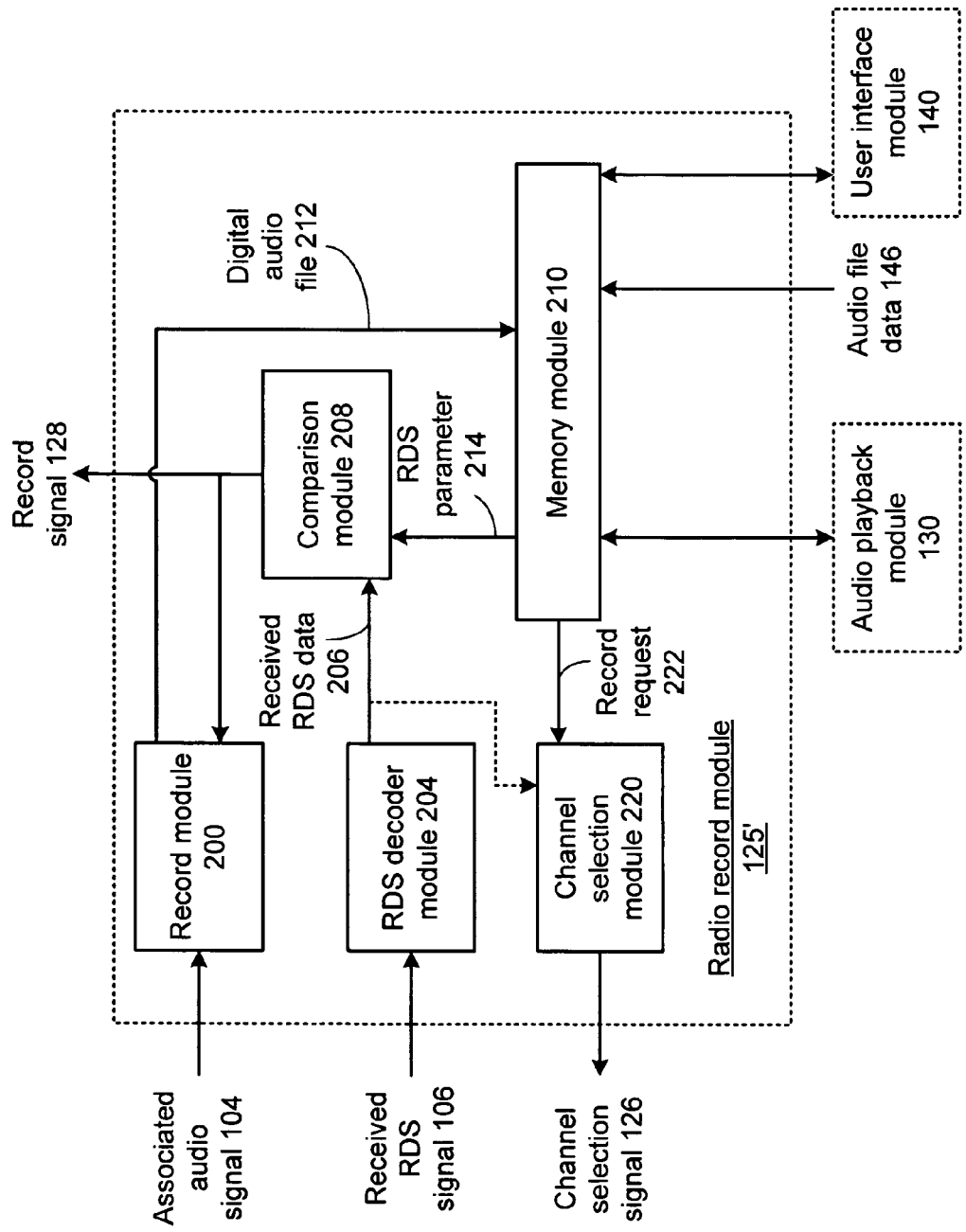
FIG. 5 presents a block diagram of a radio record module in accordance with an embodiment of the present invention.

FIG. 5 presents a block diagram of a radio record module in accordance with an embodiment of the present invention. In particular, a radio record module 125' is presented that can be used in place of radio record module 125 in implementing audio system 50. Radio record module 125' includes many similar elements of radio record module 125 that are referred to by common reference numerals. In this embodiment, record request 222 includes a selected channel and channel selection module 220 generates optional channel selection signal 126, based on the selected channel of record request 222. In this embodiment, record request 222 includes a record time that defines a time for recording module 125' to begin recording. Channel selection module 220 determines the current time from either an internal clock that is free running, an internal clock that is synchronized to clock time information from received RDS data 206 or directly from clock time information from received RDS data 206. Channel selection module asserts channel selection signal 126 to tune radio stage 102 to the selected channel, a predetermined time period, such as a time slightly greater than the longest anticipated settling time of radio stage 102, before the recording time begins.

Figure 6:
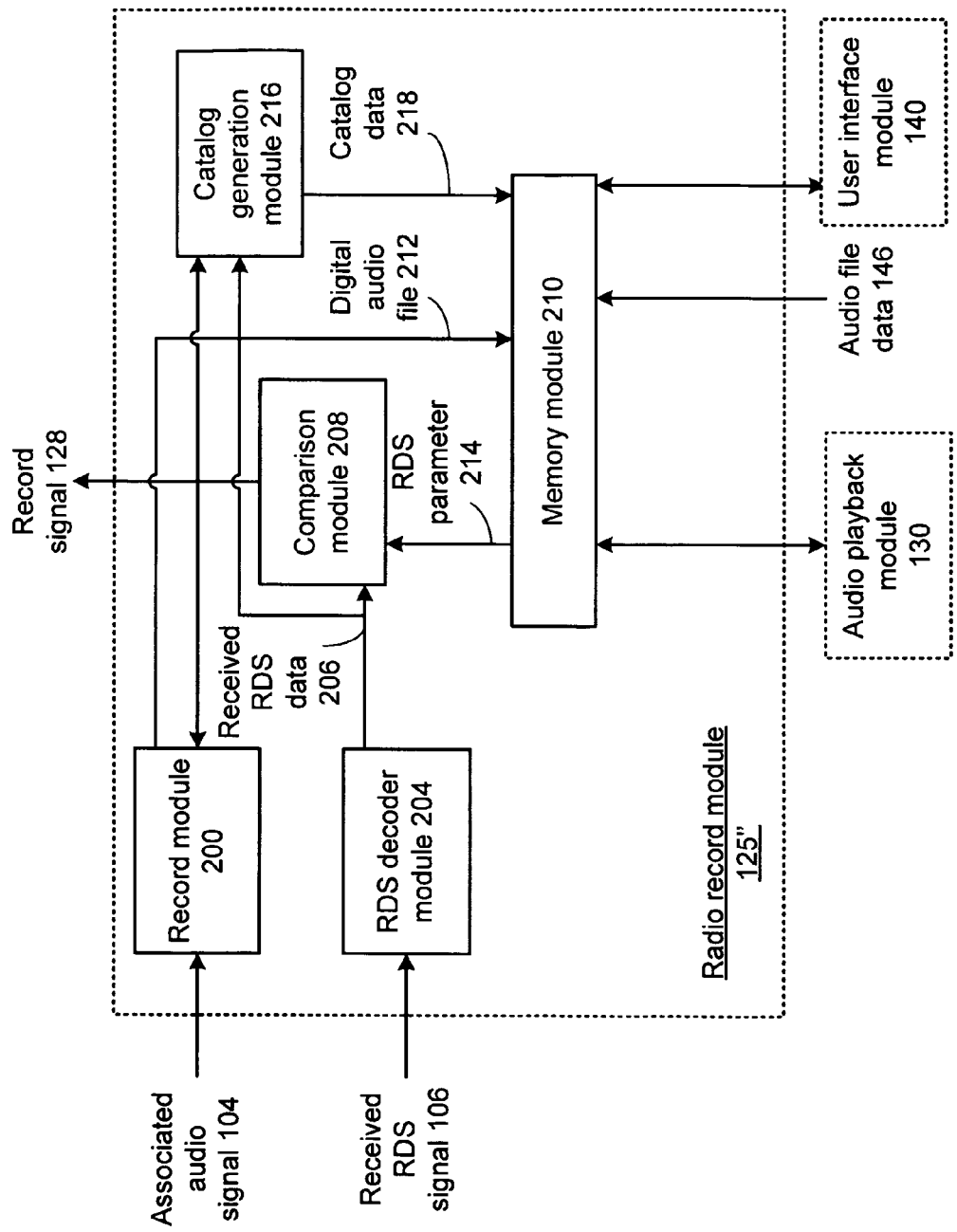
FIG. 6 presents a block diagram of a radio record module in accordance with an embodiment of the present invention.

FIG. 6 presents a block diagram of a radio record module in accordance with an embodiment of the present invention. In particular, a radio record module 125" is presented that can be used in place of radio record module 125 and/or 125' in implementing audio system 50. Radio record module 125" includes many similar elements of radio record module 125 that are referred to by common reference numerals. In this embodiment, a catalog generation module 216 generates catalog data 218, associated with the digital audio file 212, that includes an RDS parameter of the received RDS data 206. Memory module 210 stores the catalog data 218 in a catalog, along with storing the digital audio file 212.

In operation, the storage of catalog data 218 in a catalog of memory module 210, allows the digital audio file 212 to be easily accessed by the user at some later time for playback.

In an embodiment of the present invention, user interface module 140 generates a user catalog indication that includes the catalog data 218 associated with the digital audio file 212, and that selects the digital audio file for playback in response to a user selection. Further, user interface module 140 is operable to generate a user record indication in response to the record signal 128 being asserted. In particular, the inclusion of one or more RDS parameters in the catalog data allows the user to remember what has been recorded, and to sort through multiple stored digital audio files 212 to select a particular digital audio file to be played back by audio playback module 130. In an embodiment of the present invention, the RDS parameter includes a radio program title song title and/or artist name of a radio text information field. The RDS parameter can further include other RDS data such as a time of a clock time information field, a program type (such as news, sports, weather, oldies, jazz, etc.) of a program type information field, or a station identity (such as a station call sign or other station identifier) of a program service information field. By way of example, a recording of Jerry Lee Lewis's song, "Great Balls of Fire", can be stored in memory module 210 with associated catalog data 218 that includes information such as: the station call sign or other station identifier, the start time, ending time, and/or duration of the song, the song title and artist, and any other RDS parameters derived RDS data.

Figure 7:
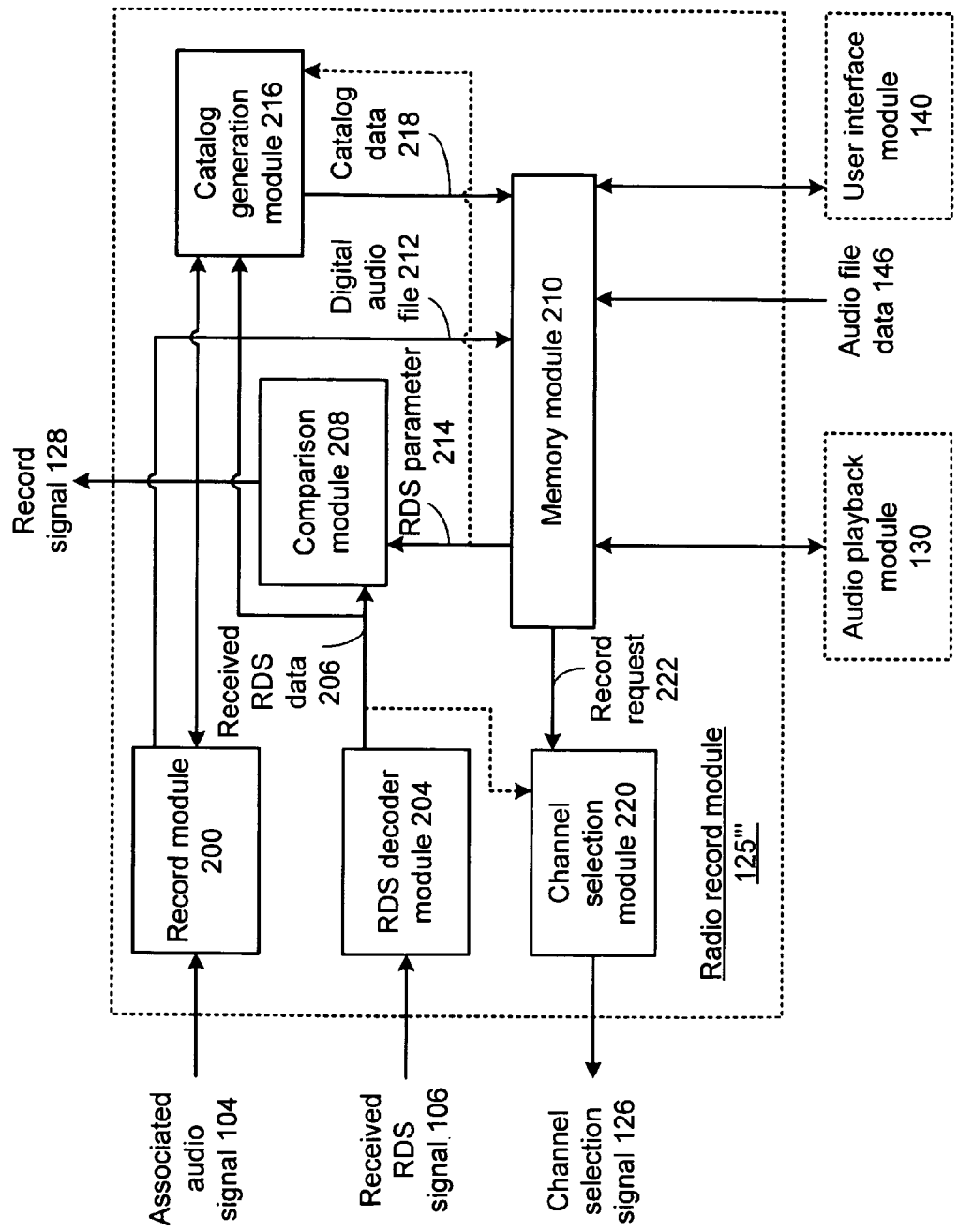
FIG. 7 presents a block diagram of a radio record module in accordance with an embodiment of the present invention.

FIG. 7 presents a block diagram of a radio record module in accordance with an embodiment of the present invention. In particular, a radio record module 125''' is presented that can be used in place of radio record module 125, 125' and/or 125' in implementing audio system 50. Radio record module 125''' includes many similar elements of radio record module 125' that are referred to by common reference numerals. In this embodiment, a catalog generation module 216 generates catalog data 218 associated with the digital audio file 212 that optionally includes the RDS parameter of the record request 222.

In this embodiment, if the recording of associated audio signal 104 is initiated by user interface module 140 when a user chooses to manually enter the record mode, such as when he or she hears a song or program to record, the digital audio file 212 can be stored with catalog data 218 that is derived from the received RDS data that is associated with that particular broadcast. On the other hand, if the recording of associated audio signal 104 is initiated by comparison module 208 finding a match between received RDS data 206 and a record request 222, the digital audio file 212 can be stored with catalog data 218 that includes an RDS parameter of the record request 222. Further, the catalog data 218 can optionally include RDS parameters from both the record request 222, and the received RDS data 206. For instance, if the user generates a record request 222 to record a song by Jerry Lee Lewis, this information can be included in the catalog data 218 along with the other information regarding the song derived from received RDS data 206 such as: the station call sign or other station identifier, the start time, ending time, and/or duration of the song, the song title, and any other RDS parameters derived RDS data.

In an embodiment of the present invention, record requests 222 can be one-time only or designated as one time only. In this fashion, after a program is recorded with received RDS data 206 that matches the record request 222, the record request is deleted to avoid duplicate recordings. For instance, a request to record "Great Balls of Fire" or KMFA on 1:00 pm-2:00 pm on Jan. $2^{nd}$, 2004, would be deleted after being recorded.

In addition or in the alternative, record requests can be multiple use or designated as multiple use with either a maximum number of recordings that is predetermined, selected by the user or that is unlimited. For instance, a predetermined or selected number of episodes of a program such as "Car Talk", or songs by "Bob Marley", could be recorded and stored until an episode is deleted. In the event of multiple recordings, certain RDS parameters can be checked against the catalog data 218 to determine if the recording would be a duplicate. For instance, if the record request 222 is for songs by Jerry Lee Lewis, before recording "Great Balls of Fire", the catalog data 218 is searched to determine if Great Balls of Fire is currently stored in memory—to avoid a duplicate recording. In this fashion, the recording module 200 does not generate the digital audio file 212 when at least a portion of the received RDS data 206, such as the song title, compares favorably (such as by matching) the catalog data corresponding to a digital audio file already stored in memory.

Figure 8:
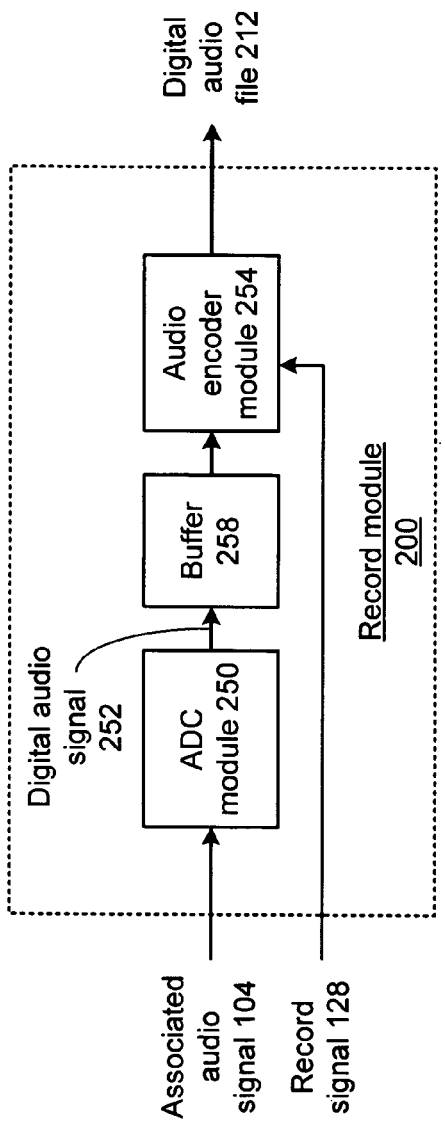
FIG. 8 presents a block diagram of a record module in accordance with an embodiment of the present invention.

FIG. 8 presents a block diagram of a record module in accordance with an embodiment of the present invention. In particular, record module 200 includes an ADC module 250 for converting the associated audio signal 104 into digital audio signal 252 that is stored in a buffer 258. Audio encoder module 254, encodes the digital audio signal 252 into a digital audio file 212 for storage in memory module 210. Audio encoder module 254 is enabled when record signal 128 is asserted and disabled when record signal 128 is deasserted so as to record associated audio signal 104 only when desired in response to a record request 222 or optionally, when manually commanded to record by user interface module 140.

As discussed in conjunction with FIG. 4, radio stage 102 optionally includes an analog to digital converter (ADC) and a digital section for performing one or more steps in the demodulation of received radio signal 100. In this embodiment, associated audio signal 104 and/or received RDS signal 106 can be digital signals and, in particular, the ADC module 250 can be omitted.

In an embodiment of the present invention, the record module records an audio program of the associated audio signal as a digital audio file in response to a record signal being asserted, wherein the recording module generates the digital audio file automatically beginning at the start of the radio program and automatically ending at the end of radio program. Audio encoder module 254 begins the digital audio file 212 at a point of digital audio signal 252 from buffer 258 that corresponds to the beginning of the audio program to be recorded. If, for instance, an RDS parameter matches a record request 222 or the record signal 128 is otherwise asserted after a song to be recorded has begun, the beginning of the song can be identified in the buffer the record module analyzing the data backward in time until a pause occurs such as by detecting silence in the digital audio signal, detecting the music in the digital audio signal, detecting voice-only in the digital audio signal, detecting a transition between these different types of digital audio signals (silence/music, silence/voice, voice/music, etc.), a program start sequence is recognized, or for a predetermined amount of time that is calculated, based on the estimated detection latency of record module 200 in response to the detection of a matching RDS parameter, to encompass the beginning of an audio program to be recorded. In this fashion, the record module 200 includes at least a portion of the digital audio signal 252 in the digital audio file 212 that was buffered by buffer 258 prior to receiving the received RDS data 206 and prior to the record signal 128 being asserted. Similarly the end of the audio program can be detected based on the expiration of the expected program duration, a change in RDS data indicating that the program has ended by detecting silence in the digital audio signal, detecting the music in the digital audio signal, detecting voice-only in the digital audio signal, detecting a transition between these different types of digital audio signals (silence/music, silence/voice, voice/music, etc.), or by other methods.

While the buffer 258 of record module 200 is shown as buffering the digital audio signal 252 prior to encoding by audio encoder module 254, in an alternative embodiment, buffer 258 can be placed after audio encoder module 254 to buffer data that has been encoded. In this embodiment, the audio file can be discarded if no recording is requested, or trimmed in the event that a recording is commenced and the buffer contains buffered audio data that begins prior to the beginning of the program to be recorded.

In an embodiment of the present invention, ADC module 250 is implemented using a delta sigma modulator, delta modulators, flash converters and other analog to digital converter methods, with or without significant over-sampling, could likewise be used in alternative embodiments of the present invention. Also, alternative delta sigma architectures could be used such as multi-stage noise shaping (MASH), multi-bit quantizers, and higher or lower order loops.

Figure 9:
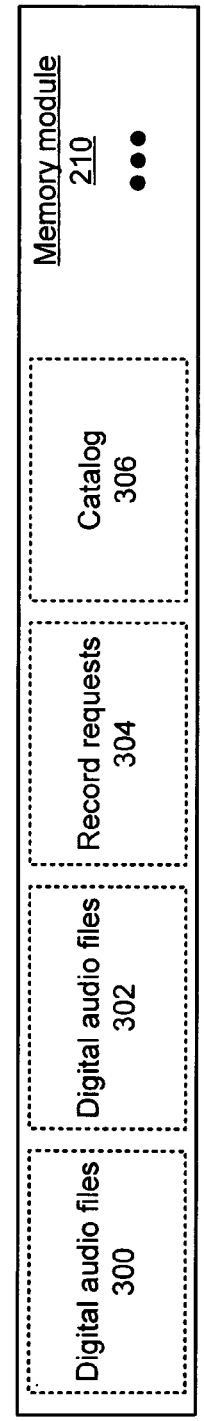
FIG. 9 presents a graphical representation of the contents of a memory module in accordance with an embodiment of the present invention.

FIG. 9 presents a graphical representation of the contents of a memory module in accordance with an embodiment of the present invention. In particular, memory module 210 includes catalog 306 of catalog data 218, stored record requests 304, such as record requests 222, digital audio files 302, such as digital audio files 212 created by record module 125 or 125' from recording associated audio signal 104. In addition, memory module includes digital audio files 300 such as audio file data 146 received from a host device 150, and also other stored digital audio files. In an embodiment of the present invention, memory module 210 includes 64 Mbytes or greater of storage capacity, including additional storage capacity for storing operation instructions used by a processing device used in the implementation of audio system 50, or for the storage of any other type of information that may be stored in a digital format. While the catalog data 218 is shown above as being stored in a separate catalog 306, the catalog data 218 can alternatively be stored in the filename or as tags that are stored in association with the digital audio files 302, in separate files for each set of catalog data associated with a digital audio file 302, or in association with a directory, such as an operating system directory, etc. Many possible data structures are possible that allow the catalog data 218 to be searched and for the associated digital audio file 302 to be retrieved.

In an embodiment of the present invention, memory module can be a single memory device or a plurality of memory devices. Such a memory device may include a read-only memory, random access memory, volatile memory, non-volatile memory, static memory, dynamic memory, flash memory, cache memory, and/or any device that stores digital information.

Figure 10:
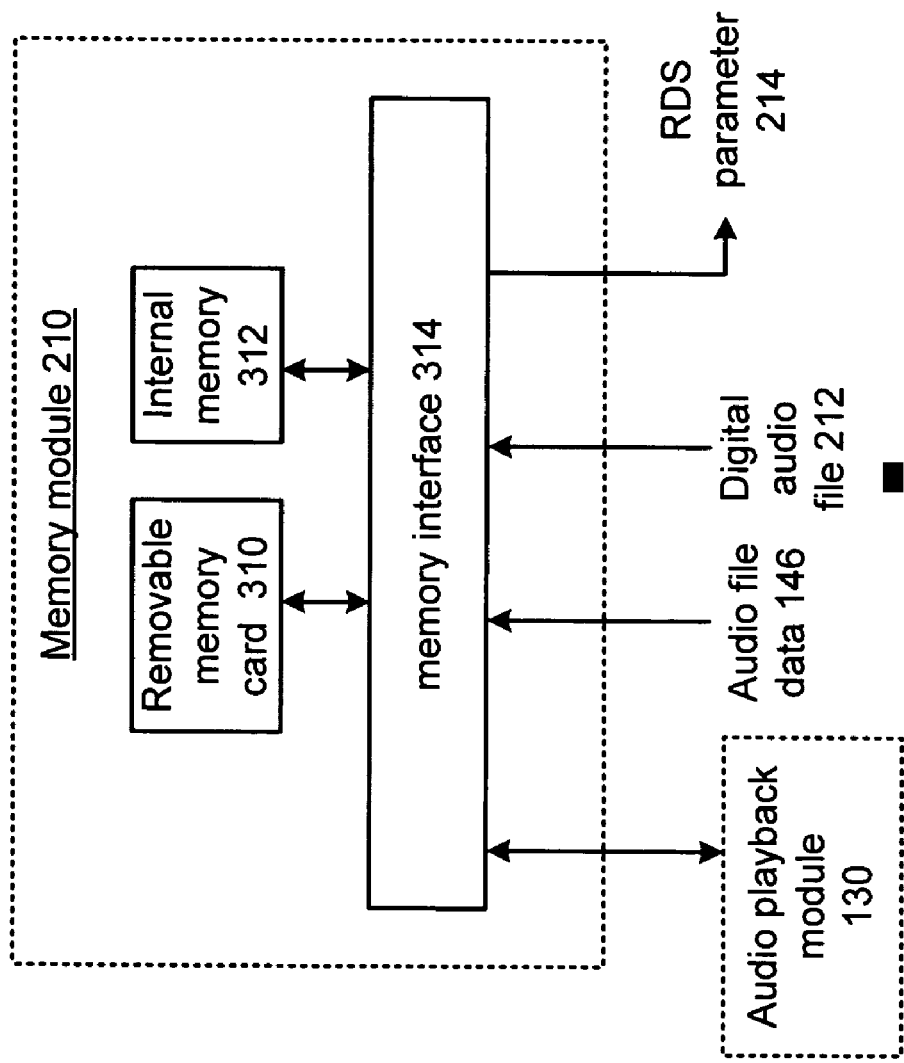
FIG. 10 presents a block diagram of a memory module in accordance with an embodiment of the present invention.

FIG. 10 presents a block diagram of a memory module in accordance with an embodiment of the present invention. In particular, memory module 210 includes a memory interface 314 for accessing an internal memory 312 and removable memory card 310. In an embodiment of the present invention, removable memory card 310 can include non-volatile memory in a format such as CompactFlash, SmartMedia, Memory Stick, Secure Digital (SD) card, xD card or other memory card format. In an embodiment of the present invention, removable memory card 310 can store digital audio files 300 that may be loaded on memory card 310, when memory card 310 is coupled or connected to a remote device, such as host device 150. In addition, memory card 310 can store digital audio files 302 and associated catalog data 218 that are recorded by radio record module 125 or 125'.

Figure 11:
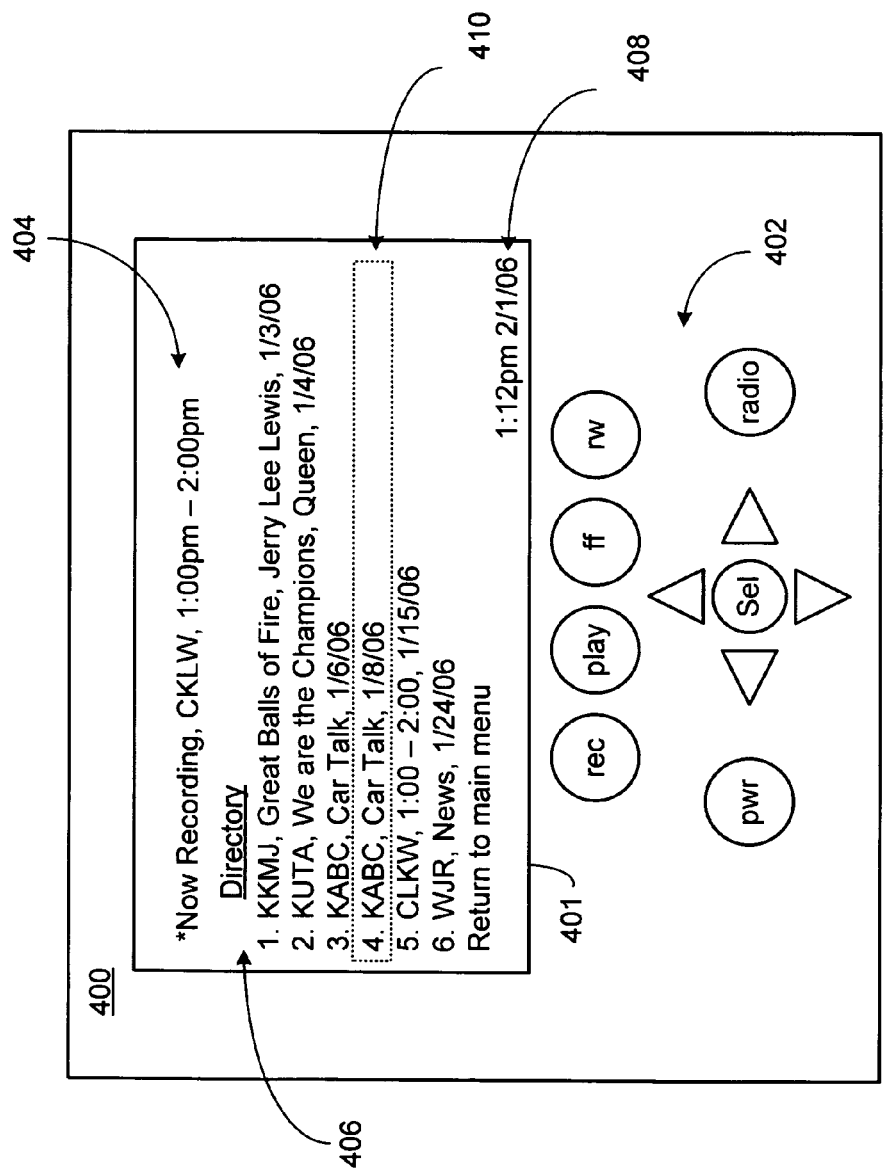
FIG. 11 presents a pictorial diagram of an audio system and elements of a user interface in accordance with an embodiment of the present invention.

FIG. 11 presents a pictorial diagram of an audio system and elements of a user interface in accordance with an embodiment of the present invention. In particular, an audio system 400, such as audio system 50, is shown that includes a display 401 for providing a user indication, a plurality of buttons 402 for generating signals in response to actions of a user, and time/date display 408.

In operation, audio system 400 generates a user catalog indication that includes a display 406 of catalog data 212 associated with a plurality of digital audio files 212. A particular digital audio file 212, in this case, the program "Car Talk" that was recorded from the station KABC on Jan. 8, 2006, can be selected for playback in response to a user selection by moving floating curser box 410 over the particular displayed catalog entry and by pressing either the "play" button or the "sel" (select) button. Audio system 400 commands audio playback module 130 to retrieve the selected digital audio file 212 from memory 210 and to generate an audio playback signal 136 from the digital audio file. Audio system 400 also asserts a playback mode signal 134 in response, and switches output selection switch 132 to produce an audio output 138 that includes the audio playback signal 136.

Audio system 400 is further operable to generate a user record indication 404 in response to the record signal 128 being asserted. In this fashion, the user can monitor which program is currently being recorded. In addition, audio system 400 includes an Radio button that, when pressed by the user, deasserts playback mode signal 134 that switches output selection switch 132 to produce an audio output 138 that includes the associated audio signal 106.

Figure 12:
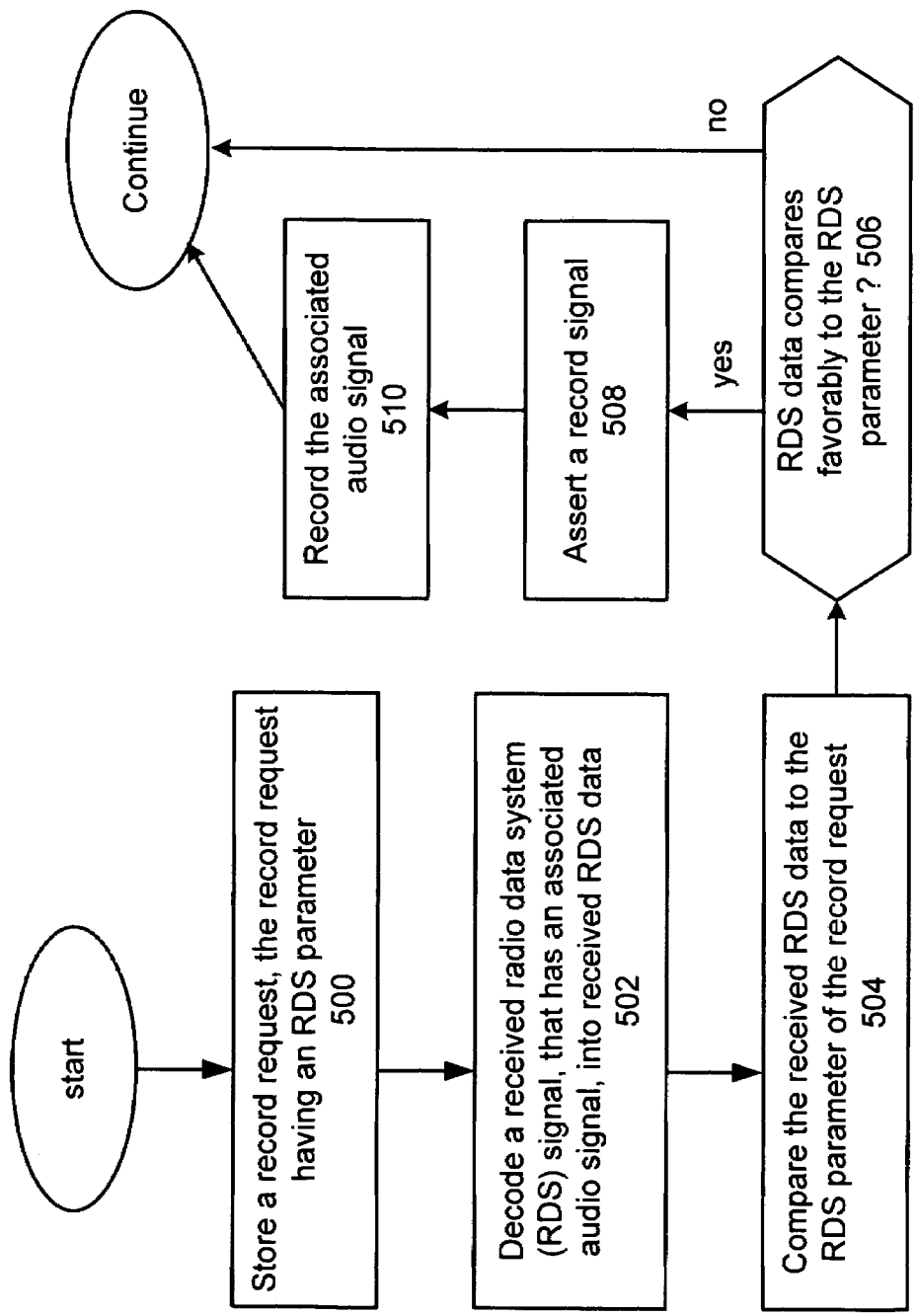
FIG. 12 presents a flowchart representation of a method in accordance with an embodiment of the present invention.

FIG. 12 presents a flowchart representation of a method in accordance with an embodiment of the present invention. In particular, a method is presented for use in conjunction with one or more of the features and functions presented in association with FIGS. 1-11 In step 500, a record request having an RDS parameter, is stored. In step 502, a received radio data system (RDS) signal, that has an associated audio signal, is decoded into received RDS data. In step 504, the received RDS data is compared to the RDS parameter of the record request. In step 506, the method determines if the received RDS data compares favorably to the RDS parameter. If not, the method continues. If so, the method executes step 508 where a record signal is asserted and step 510, where the associated audio signal is recorded in response to the record signal being asserted.

In embodiments of the present invention, the RDS parameter includes a radio program title, a song title, and/or a artist name of a radio text information field, a time of a clock time information field, and/or a program type of a program type information field.

In an embodiment, step 502 includes storing a plurality of record requests and step 504 includes comparing the received RDS data to the RDS parameter of a plurality of the record requests. In an embodiment, step 510 includes recording the associated audio signal into a digital audio file.

In an embodiment, the record request includes a plurality of RDS parameters and the step of asserting includes asserting the record signal when the received RDS data compares favorably to each of the plurality of RDS parameters. Alternatively, the record request includes a plurality of RDS parameters and the step of asserting includes asserting the record signal when the received RDS data compares favorably to one of the plurality of RDS parameters.

As discussed in association with FIG. 8, step 502 further includes buffering the associated audio signal and step 510 optionally includes beginning the recording of the audio signal at a point of the audio signal that corresponds to the beginning of the audio program to be recorded. If, for instance, an RDS parameter matches a record request after a song to be recorded has begun, the beginning of the song can be identified in the buffer by moving backward in the data until a pause occurs, a program start sequence is recognized, or a predetermined amount of time, calculated based on the estimated detection latency to encompass the beginning of an audio program to be recorded.

Figure 13:
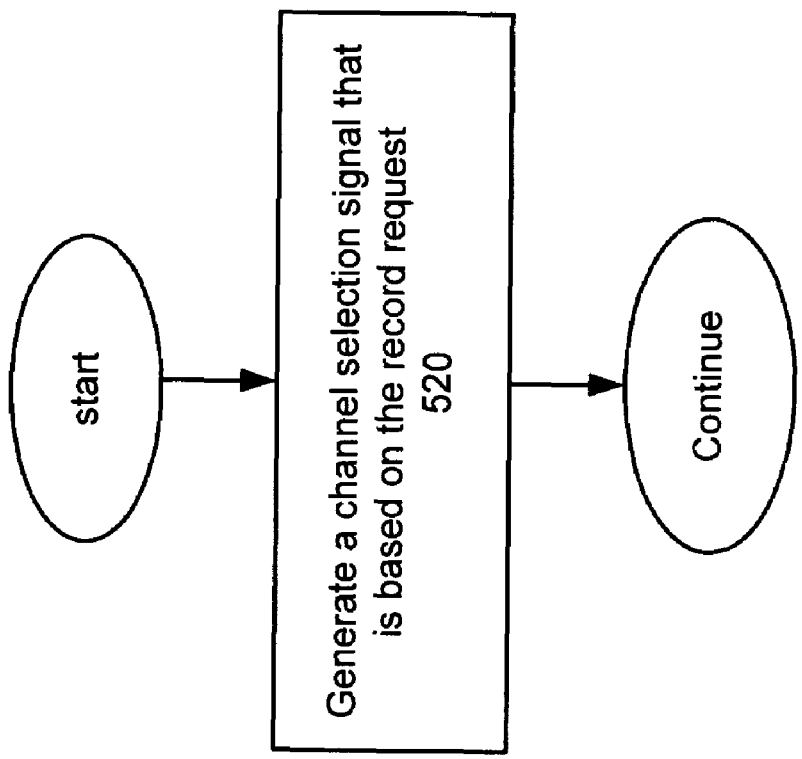
FIG. 13 presents a flowchart representation of a method in accordance with an embodiment of the present invention.

FIG. 13 presents a flowchart representation of a method in accordance with an embodiment of the present invention. In particular, a method is presented for use in conjunction with one or more of the features and functions presented in association with FIGS. 1-11 and for use particularly with the method of FIG. 12. In this embodiment, the record request includes the channel, and wherein method further includes step 520 for generating a channel selection signal that is based on the record request.

Figure 14:
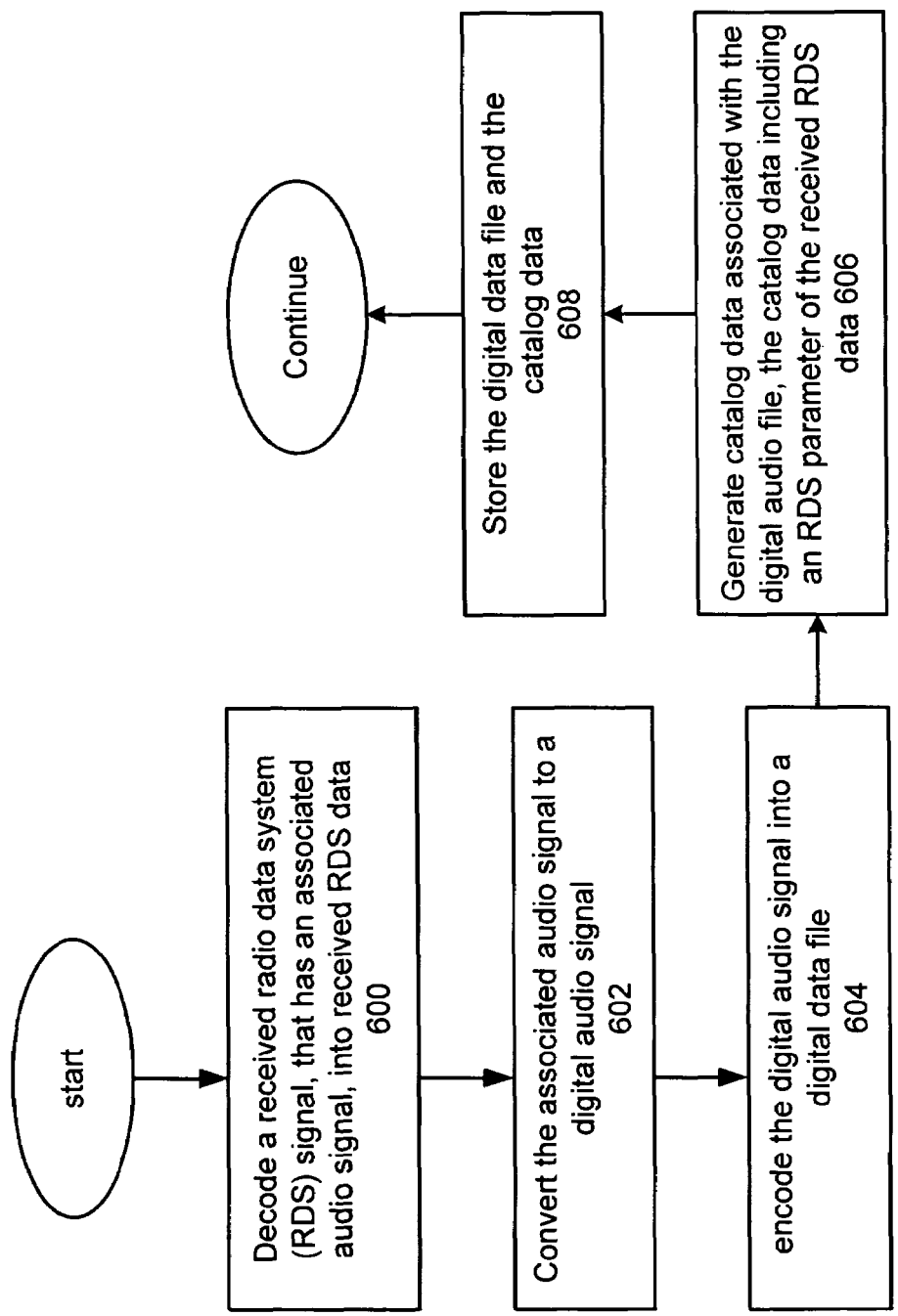
FIG. 14 presents a flowchart representation of a method in accordance with an embodiment of the present invention.

FIG. 14 presents a flowchart representation of a method in accordance with an embodiment of the present invention. In particular, a method is presented for use in conjunction with one or more of the features and functions presented in association with FIGS. 1-13. In step 600, a received radio data system (RDS) signal, that has an associated audio signal, is decoded into received RDS data. In step 602, the associated audio signal is converted to a digital audio signal in response to a record signal being asserted. In step 604, the digital audio signal is encoded into a digital data file. In step 606, catalog data associated with the digital audio file is generated, the catalog data including an RDS parameter of the received RDS data. In step 608 the digital audio file and catalog data are stored. (need to replace "directory" with catalog in FIG. 14, 606).

In an embodiment of the present invention, the catalog data includes one or more RDS parameters of the received RDS data. These RDS parameters can be a radio program title of a radio text information field; a song title of a radio text information field; a artist name of a radio text information field; a program type of a program type information field, a station identity of a program service information field, a time of a clock time information field and/or a station identity of a program service information field.

Figure 15:
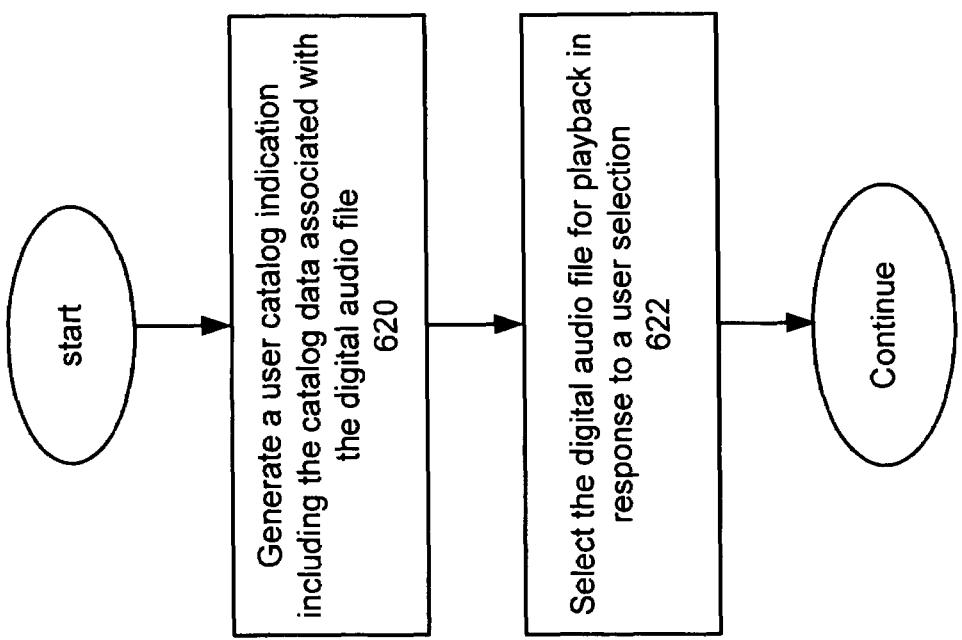
FIG. 15 presents a flowchart representation of a method in accordance with an embodiment of the present invention.

FIG. 15 presents a flowchart representation of a method in accordance with an embodiment of the present invention. In particular, a method is presented for use in conjunction with one or more of the features and functions presented in association with FIGS. 1-13 and for use particularly with the method of FIG. 14. In step 620, a user catalog indication is generated that includes the catalog data associated with the digital audio file. In step 622, the digital audio file is selected for playback in response to a user selection.

Figure 16:
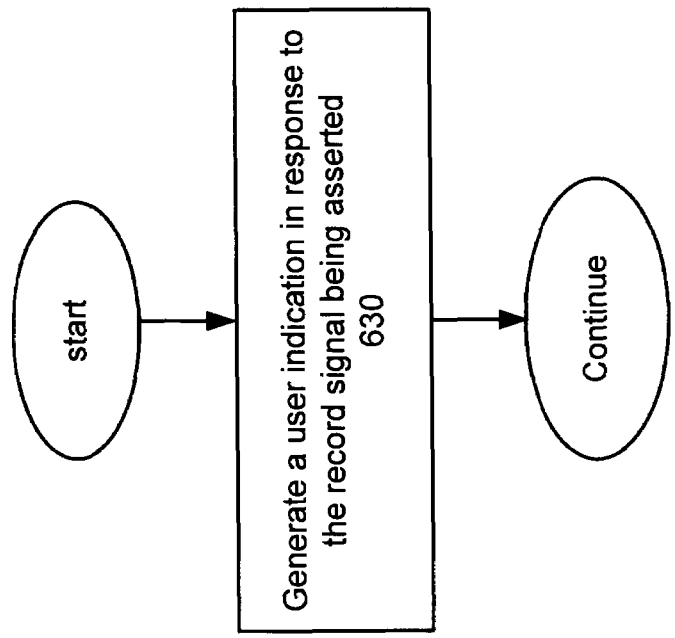
FIG. 16 presents a flowchart representation of a method in accordance with an embodiment of the present invention.

FIG. 16 presents a flowchart representation of a method in accordance with an embodiment of the present invention. In particular, a method is presented for use in conjunction with one or more of the features and functions presented in association with FIGS. 1-15 and for use particularly with the method of FIG. 14. In step 630, a user record indication is generated in response to the record signal being asserted.

Figure 17:
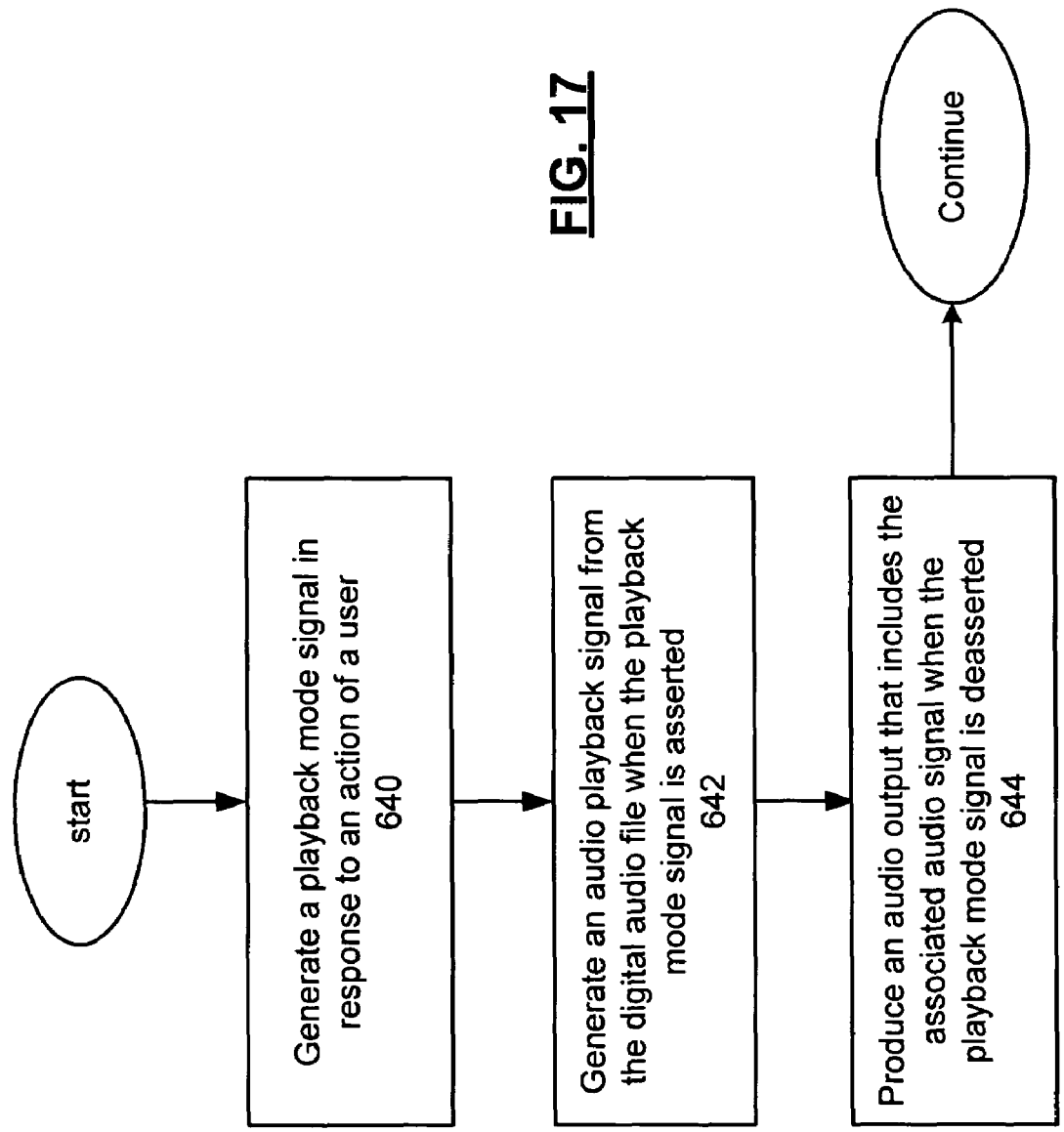
FIG. 17 presents a flowchart representation of a method in accordance with an embodiment of the present invention.

FIG. 17 presents a flowchart representation of a method in accordance with an embodiment of the present invention. In particular, a method is presented for use in conjunction with one or more of the features and functions presented in association with FIGS. 1-16 and for use particularly with the method of FIG. 14. In step 640, a playback mode signal is generated in response to an action of a user. In step 642, an audio playback signal is generated from the digital audio file when the playback mode signal is asserted. In step 644, an audio output is produced that includes the associated audio signal when the playback mode signal is deasserted.

Figure 18:
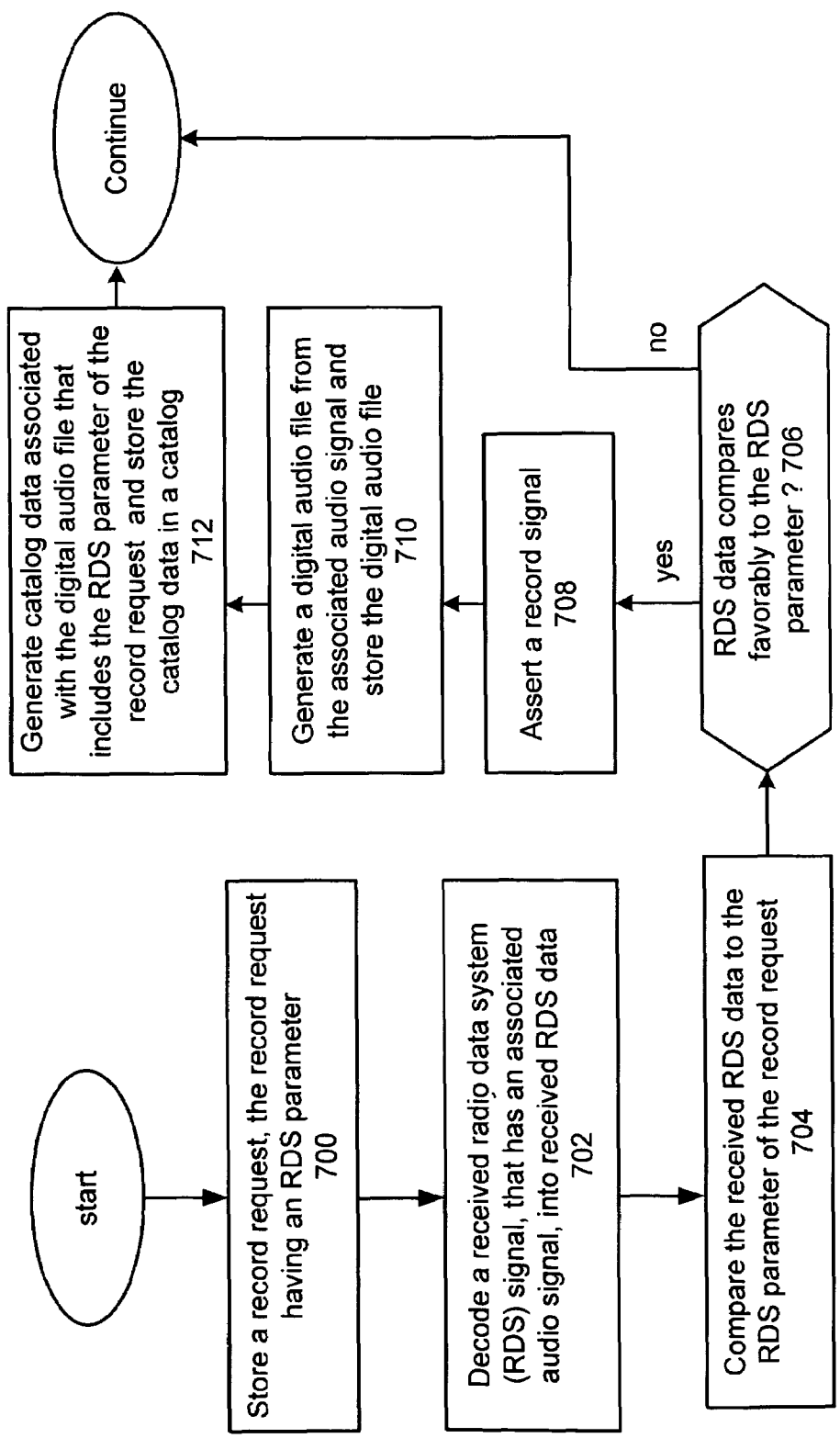
FIG. 18 presents a flowchart representation of a method in accordance with an embodiment of the present invention.

FIG. 18 presents a flowchart representation of a method in accordance with an embodiment of the present invention. In particular, a method is presented for use in conjunction with one or more of the features and functions presented in association with FIGS. 1-17. In step 700, a record request is stored, the record request having an RDS parameter. In step 702, a received RDS signal, that has an associated audio signal, is decoded into received RDS data. In step 704, the received RDS data is compared to the RDS parameter of the record request. In step 706, the method determines if the RDS data compares favorably to the RDS parameter. If not, the method continues. If so, steps 708, 710 and 712 are performed. In step 708, a record signal is asserted. In step 710, a digital audio file is generated from the associated audio signal. In step 712, catalog data associated with the digital audio file is generated and stored in a catalog, wherein the catalog data includes the RDS parameter of the record request.

In an embodiment of the present invention, step 712 further includes generating catalog data that includes at least one RDS parameter of the received RDS data. Further, either the RDS parameter of the received RDS data or the RDS parameter of the record request includes at least one of: a radio program title; a song title; a artist name; and a program type, a station identity or a time. In FIG. 18 need to replace "directory" with catalog in 712 block.

As discussed in association with FIG. 8, step 702 further includes buffering the associated audio signal and step 710 optionally includes beginning the recording of a digital audio file at a point of the audio signal that corresponds to the beginning of the audio program to be recorded. If, for instance, an RDS parameter matches a record request after a song to be recorded has begun, the beginning of the song can be identified in the buffer by moving backward in the data until a pause occurs, a program start sequence is recognized, or a predetermined amount of time, calculated based on the estimated detection latency to encompass the beginning of an audio program to be recorded.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

In preferred embodiments, the various circuit components are implemented using 0.35 micron or smaller CMOS technology. Provided however that other circuit technologies, both integrated or non-integrated, may be used within the broad scope of the present invention. Likewise, various embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

Thus, there has been described herein an apparatus and method, as well as several embodiments including a preferred embodiment, for implementing a handheld audio system, audio system, and radio record module. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. An audio system comprising:
    a radio stage that demodulates a selected channel of a received radio signal into a received radio data system (RDS) signal and an associated audio signal;
    a RDS decoder module, operatively coupled to the radio stage, that decodes the received RDS signal into received RDS data;
    a memory module that stores a record request, the record request having an RDS parameter;
    a comparison module, operatively coupled to the RDS module and the memory module, that compares the received RDS data to the RDS parameter of the record request and that asserts a record signal when the received RDS data compares favorably to the RDS parameter; and
    a record module, operatively coupled to the radio stage and the comparison module, that records the associated audio signal in response to the record signal being asserted.

2. The audio system of claim 1 wherein the RDS parameter includes at least one of a radio program title of a radio text information field; a song title of a radio text information field; an artist name of a radio text information field; a time of a clock time information field; a program type of a program type information field; a station identity of a program service information field.

3. The audio system of claim 1 wherein the record request includes the channel, and wherein the audio system further comprises:

a channel selection module, operatively coupled to the radio stage and the memory module for selecting the selected channel based on the record request.

4. The audio system of claim 1 wherein the memory modules stores a plurality of record requests and the comparison module is operable to compare the received RDS data to the RDS parameter of a plurality of the record requests.

5. The audio system of claim 1 wherein the record request includes a plurality of RDS parameters and the comparison module asserts the record signal when the received RDS data compares favorably to each of the plurality of RDS parameters.

6. The audio system of claim 1 wherein the record request includes a plurality of RDS parameters and the comparison module asserts the record signal when the received RDS data compares favorably to one of the plurality of RDS parameters.

7. The audio system of claim 1 wherein the record module records the associated audio signal into a digital audio file that is stored in the memory module.

8. The audio system of claim 7 further comprising:
an audio playback module, operably coupled to the memory module, that generates an audio playback signal from the digital audio file.

9. The audio system of claim 8 further comprising:
an output selection switch, that produces an audio output that includes the audio playback signal, when a playback mode signal is asserted, and that includes the associated audio signal when the playback mode signal is deasserted; and
a user interface module, operably coupled to the output selection switch, that generates the playback mode signal in response to an action of a user.

10. The audio system of claim 9 further wherein the user interface module is also coupled to the radio record module and is further operable to generate a user indication in response to the record signal being asserted.

11. The audio system of claim 8 further comprising:
a host interface that is couplable to a host device and that is operable to receive audio file data when coupled to the host device;
wherein the memory module is also coupled to the host interface and is further operable to store the audio file data as a received audio file, and wherein the audio playback module is further operable to generate the audio playback signal based on the received audio file.

12. The audio system of claim 7 wherein the record module generates the digital audio file automatically beginning at the start of an audio program and automatically ending at the end of audio program.

13. The audio system of claim 11 wherein the record module includes a buffer for buffering a digital audio signal from the associated audio signal, prior to the record signal being asserted and wherein the record module detects the start of the audio program based on at least one of: silence in the digital audio signal, music in the digital audio signal, voice-only in the digital audio signal, and a predetermined time.

14. The audio system of claim 11 wherein the record module detects the end of the audio program based on at least one of: silence in the associated audio signal, music in the associated audio signal, voice-only in the associated audio signal, and a predetermined time.

15. A radio record module comprising:
a radio data system (RDS) decoder module, that decodes a received RDS signal, that has an associated audio signal, into received RDS data;
a memory module that stores a record request, the record request having an RDS parameter; a comparison module, operatively coupled to the RDS module and the memory module, that compares the received RDS data to the RDS parameter of the record request and that asserts a record signal when the received RDS data compares favorably to the RDS parameter; and
a record module, operatively coupled to the comparison module, that records the associated audio signal in response to the record signal being asserted.

16. The radio record module of claim 15 wherein the RDS parameter includes at least one of a radio program title of a radio text information field; a song title of a radio text information field; an artist name of a radio text information field; a time of a clock time information field; a program type of a program type information field; a station identity of a program service information field.

17. The radio record module of claim 15 wherein the record request includes the channel, and wherein the radio record module further comprises:
a channel selection module, operatively coupled to the memory module for generating a channel selection signal that is based on the record request.

18. The radio record module of claim 15 wherein the memory modules stores a plurality of record requests and the comparison module is operable to compare the received RDS data to the RDS parameter of a plurality of the record requests.

19. The radio record module of claim 15 wherein the record request includes a plurality of RDS parameters and the comparison module asserts the record signal when the received RDS data compares favorably to each of the plurality of RDS parameters.

20. The radio record module of claim 15 wherein the record request includes a plurality of RDS parameters and the comparison module asserts the record signal when the received RDS data compares favorably to one of the plurality of RDS parameters.

21. The radio record module of claim 15 wherein the record module records the associated audio signal into a digital audio file that is stored in the memory module.

22. A method comprising:
decoding a received radio data system (RDS) signal, that has an associated audio signal, into received RDS data;
storing a record request, the record request having an RDS parameter;
comparing the received RDS data to the RDS parameter of the record request;
asserting a record signal when the received RDS data compares favorably to the RDS parameter; and
recording the associated audio signal in response to the record signal being asserted.

23. The method of claim 22 wherein the RDS parameter includes at least one of a radio program title of a radio text information field; a song title of a radio text information field; an artist name of a radio text information field; a time of a clock time information field; a program type of a program type information field; a station identity of a program service information field.

24. The method of claim 22 wherein the record request includes the channel, and wherein method further comprises:
generating a channel selection signal that is based on the record request.

25. The method of claim 22 wherein the step of storing includes storing a plurality of record requests and the step of comparing includes comparing the received RDS data to the RDS parameter of a plurality of the record requests.

26. The method of claim 22 wherein the record request includes a plurality of RDS parameters and the step of asserting includes asserting the record signal when the received RDS data compares favorably to each of the plurality of RDS parameters.

27. The method of claim 22 wherein the record request includes a plurality of RDS parameters and the step of asserting includes asserting the record signal when the received RDS data compares favorably to one of the plurality of RDS parameters.

28. The method of claim 22 wherein the step of recording includes recording the associated audio signal into a digital audio file.

29. A radio record module comprising:
   a memory module that stores a record request, the record request having an RDS parameter;
   a radio data system (RDS) decoder module, that decodes a received RDS signal, that has an associated audio signal, into received RDS data;
   a comparison module, operatively coupled to the RDS module and the memory module, that compares the received RDS data to the RDS parameter of the record request and that asserts a record signal when the received RDS data compares favorably to the RDS parameter; and
   a recording module, operatively coupled to the comparison module, that records the associated audio signal as a digital audio file in response to the record signal being asserted, the recording module including a buffer for buffering a digital audio signal from the associated audio signal, prior to the record signal being asserted.

30. The radio record module of claim 29 wherein the RDS parameter includes at least one of a radio program title of a radio text information field; a song title of a radio text information field; an artist name of a radio text information field; a time of a clock time information field; a program type of a program type information field; a station identity of a program service information field.

31. The radio record module of claim 29 wherein the record request includes the channel, and wherein the radio record module further comprises:
   a channel selection module, operatively coupled to the memory module for generating a channel selection signal that is based on the record request.

32. The radio record module of claim 29 wherein the memory modules stores a plurality of record requests and the comparison module is operable to compare the received RDS data to the RDS parameter of a plurality of the record requests.

33. The radio record module of claim 29 wherein the record request includes a plurality of RDS parameters and the comparison module asserts the record signal when the received RDS data compares favorably to each of the plurality of RDS parameters.

34. The radio record module of claim 29 wherein the record request includes a plurality of RDS parameters and the comparison module asserts the record signal when the received RDS data compares favorably to one of the plurality of RDS parameters.

35. The radio record module of claim 29 wherein the recording module begins the digital audio file at a point of the associated audio signal that corresponds to the beginning of an audio program being recorded.

36. The radio record module of claim 35 wherein the recording module includes, in the digital audio file, a portion of the digital audio signal that was buffered prior to the record signal being asserted.

37. An audio system comprising:
   a radio stage that demodulates a selected channel of a received radio signal into an associated audio signal;
   a recording module that records the associated audio signal as a digital audio file in response to a record signal being asserted, the recording module including a buffer for buffering a digital audio signal from the associated audio signal, prior to the record signal being asserted;
   an audio playback module, operably coupled to a memory module, that generates an audio playback signal from the digital audio file;
   an output selection switch, that produces an audio output that includes the audio playback signal, when a playback mode signal is asserted, and that includes the associated audio signal when the playback mode signal is deasserted; and
   a user interface module, operably coupled to the output selection switch, that generates the playback mode signal in response to an action of a user.

38. The audio system of claim 37 wherein the recording module begins the digital audio file at a point of the associated audio signal that corresponds to the beginning of an audio program being recorded.

39. The audio system of claim 38 wherein the recording module stores, in the digital audio file, a portion of the digital audio signal that was buffered prior to the record signal being asserted.

40. The audio system of claim 37 wherein the user interface module is also coupled to the radio record module and is further operable to generate a user indication in response to the record signal being asserted.

41. The audio system of claim 37 further comprising:
   a host interface that is couplable to a host device and that is operable to receive audio file data when coupled to the host device;
   wherein the memory module is also coupled to the host interface and is further operable to store the audio file data as a received audio file, and wherein the audio playback module is further operable to generate the audio playback signal based on the received audio file.

42. The audio system of claim 37 wherein the radio stage further demodulates a received RDS signal and the audio system further comprises:
   a RDS decoder module, operably coupled to the radio stage, that decodes the received RDS signal into received RDS data; and
   a catalog generation module, operably coupled to the RDS decoder module, that generates catalog data associated with the digital audio file, the catalog data including an RDS parameter of the received RDS data.

43. The audio system of claim 37 wherein the record module generates the digital audio file automatically beginning at the start of an audio program and automatically ending at the end of audio program.

44. The audio system of claim 43 wherein the record module detects the start of the audio program based on at least one of: silence in the digital audio signal, music in the digital audio signal, voice-only in the digital audio signal, and a predetermined time.

45. The audio system of claim 43 wherein the record module detects the end of the audio program based on at least one of: silence in the associated audio signal, music in the associated audio signal, voice-only in the associated audio signal, and a predetermined time.

* * * * *